United States Patent [19]
Fukui

[11] Patent Number: 5,179,458
[45] Date of Patent: Jan. 12, 1993

[54] LIQUID CRYSTAL ELECTRO-OPTIC DEVICE WITH PARTICULAR RELATIONSHIP BETWEEN RETARDATION FILM DRAWING DIRECTION AND SUBSTRATE EDGE

[75] Inventor: Takashi Fukui, Kanagawa, Japan

[73] Assignee: Semiconductor Energy Laboratory Co., Ltd., Atsugi, Japan

[21] Appl. No.: 745,886

[22] Filed: Aug. 16, 1991

[30] Foreign Application Priority Data

Aug. 23, 1990 [JP] Japan .................. 2-223559

[51] Int. Cl.$^5$ .................. G02F 1/1335; G02F 1/1337; G02F 1/13
[52] U.S. Cl. ........................ 359/73; 359/75; 359/102
[58] Field of Search ............. 359/73, 102, 75

[56] References Cited

U.S. PATENT DOCUMENTS

| | | | |
|---|---|---|---|
| 4,844,569 | 7/1989 | Wada et al. | 359/73 |
| 4,984,874 | 1/1991 | Yamamoto et al. | 359/73 |

FOREIGN PATENT DOCUMENTS

| | | |
|---|---|---|
| 0350062 | 1/1990 | European Pat. Off. . |
| 0350075 | 1/1990 | European Pat. Off. . |
| 0382460 | 8/1990 | European Pat. Off. . |
| 0452062 | 10/1991 | European Pat. Off. . |
| 0144420 | 6/1991 | Japan . |

*Primary Examiner*—John S. Heyman
*Assistant Examiner*—Anita Pellman Gross
*Attorney, Agent, or Firm*—Sixbey, Friedman, Leedom & Ferguson

[57] ABSTRACT

A liquid crystal electro-optic device is disclosed. The liquid crystal electro-optic device is provided with means for optic compensation in order to realize black-and-white display. A high contrast black-and-white display is realized by providing two retardation films having anisotropy of refractive index for optic compensation so that an angle (a) formed by the drawing direction of one of the two retardation films and an edge line of a liquid crystal panel of the device and an angle (b) formed by the drawing direction of the other one of the two retardation films and the edge line satisfy the expressions: $(a) \leq 90°$; $(b) \leq 90°$; and $|(a)-(b)| \leq 40°$.

15 Claims, 5 Drawing Sheets

LIQUID CRYSTAL ELECTRO-OPTIC DEVICE WITH PARTICULAR RELATIONSHIP BETWEEN RETARDATION FILM DRAWING DIRECTION AND SUBSTRATE EDGE

BACKGROUND OF THE INVENTION

1. Field of the Invention

The present invention relates to a liquid crystal electroptic device.

2. Description of the Prior Art

Conventionally, an STN type liquid crystal display device taking advantage of birefringence is known. The conventional STN type liquid crystal display device displays colored display in a yellow-green mode or a blue mode. In order to realize black-and-white display, the conventional STN type liquid crystal display device is provided with an STN type liquid crystal panel for compensating for the colored display in addition to its STN type liquid crystal panel for driving liquid crystal. However, this conventional device is thick and heavy and the number of its manufacture steps is increased and cost of its manufacture is high.

SUMMARY OF THE INVENTION

It is an object of the present invention to provide a liquid crystal electro-optic device provided with means for optic compensation with a high contrast.

It is another object of the present invention to provide a light-weight liquid crystal electro-optic device provided with means for optic compensation.

It is a further object of the present invention to provide a liquid crystal electro-optic device provided with means for optic compensation with low cost.

To achieve the foregoing and other object, a liquid crystal electro-optic panel comprising a pair of substrates provided with electrodes thereon and a liquid crystal layer which is provided between the substrates and comprises nematic liquid crystal having positive dielectric anisotropy and has a twist angle of 180° to 270° is provided with a first retardation film (a first phase difference film) and a second retardation film (a second phase difference film) so that an angle (a) formed by an edge line of the panel (that is, an edge line of one of the substrates) and the drawing direction of the first film and an angle (b) formed by said edge line and the drawing direction of the second film are represented by the following expressions.

$$(a) \leq 90°; (b) \leq 90°; \text{ and } |(a)-(b)| \leq 40°$$

The first film and the second film exhibit anisotropy of refractive index.

The first film and the second film may be polymer films or macromolecule films.

The first film and the second film are typically formed in a manner that the first film and the second film are drawn in one direction during the formation thereof from pellets comprising polymer at a temperature at which the pellets can be transformed into a film by the drawing. In this case, this one direction is parallel to the above-mentioned drawing direction in the first film and in the second film. The pellets typically comprise polyvinyl alcohol or polycarbonate. The first film and the second film typically comprise polyvinyl alcohol or polycarbonate.

In FIG. 5 is shown relationship between $|(a)-(b)|$ and display contrast of a liquid crystal electro-optic device comprising a liquid crystal panel and means for optic compensation which is provided on a surface of the panel and comprises two polymer films having anisotropy of refractive index as shown in FIG. 3. The sum of retardations ($\Delta$nd) of the two films is 0.85 to 1.15 times retardation ($\Delta$nd) of the liquid crystal panel in measurements of FIG. 5. In FIG. 5, a high contrast not lower than 80 is obtained in case of $|(a)-(b)|$ being not higher than 40°.

In FIG. 6 is shown relationship between $|(a)-(b)|$ and display contrast of a liquid crystal electro-optic device comprising a pair of polymer films having anisotropy of refractive index and a liquid crystal panel provided between the polymer films as shown in FIG. 4. The sum of retardation ($\Delta$nd) of the polymer films is 0.85 to 1.15 times retardation ($\Delta$nd) of the liquid crystal panel and the retardations ($\Delta$nd) of the polymer films are substantially equal to each other in measurements of FIG. 6. This cause a higher contrast. In FIG. 6, a high contrast not lower than 80 is obtained in case of $|(a)-(b)|$ being not more than 40°. Higher contrast can be obtained in case of the liquid crystal electro-optic device shown in FIG. 4 than in case of the liquid crystal electro-optic device shown in FIG. 3.

BRIEF DESCRIPTION OF THE PREFERRED EMBODIMENTS

DETAILED DESCRIPTION OF THE PREFERRED EMBODIMENTS

Figure 1:
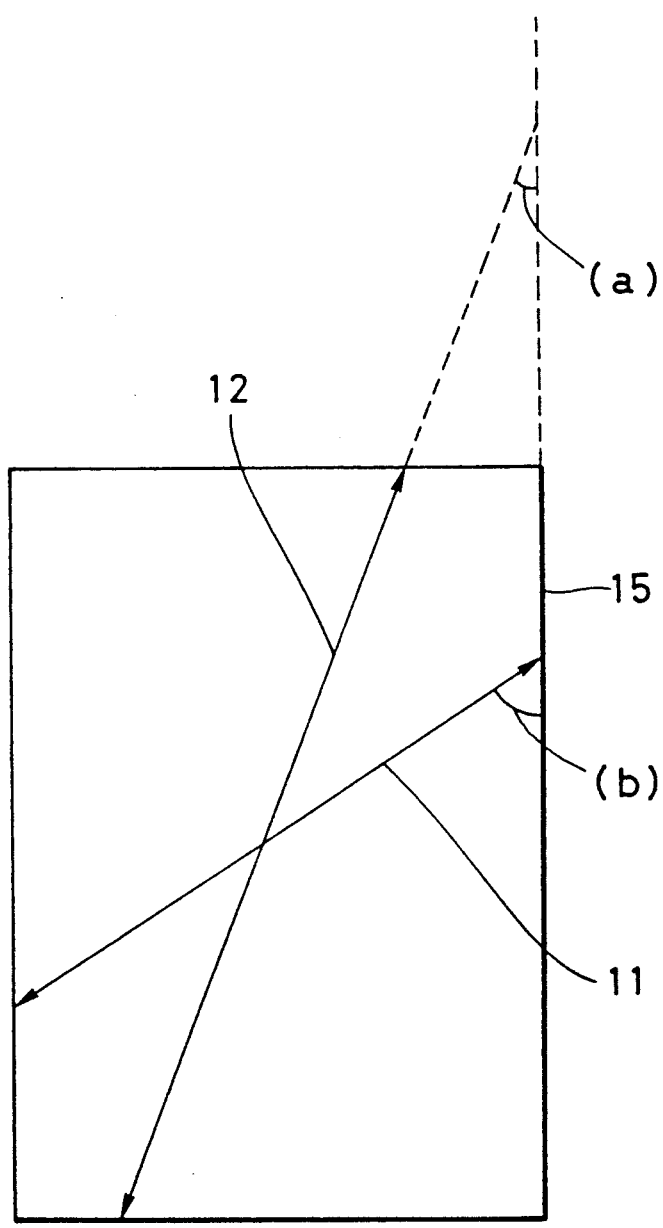
FIG. 1 is an explanatory view showing angles formed by an edge line of a liquid crystal panel and drawing directions of retardation films for optic compensation in accordance with a first preferred embodiment.
Figure 3:
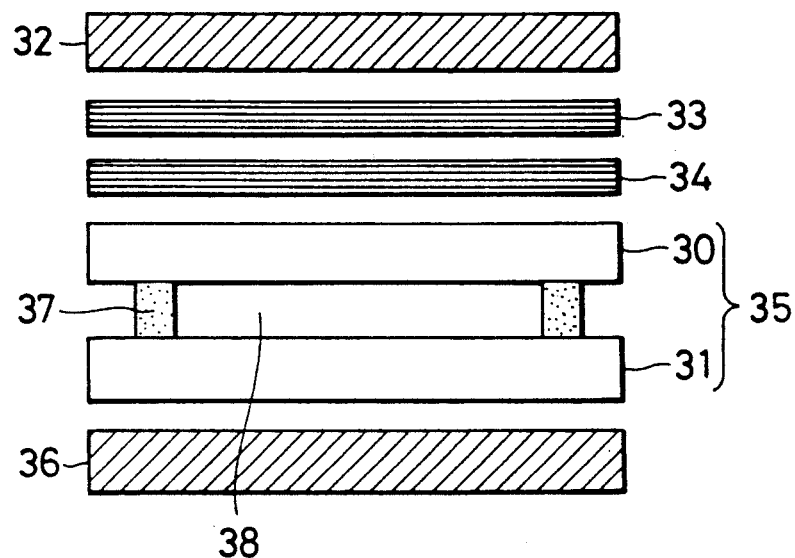
FIG. 3 is a schematic cross sectional view showing a liquid crystal electro-optic device in accordance with a first preferred embodiment of the present invention.

Referring to FIGS. 1 and 3, a liquid crystal electro-optic device in accordance with a first preferred embodiment of the present invention will be described. A transparent conductive film made of ITO (indium tin oxide) is formed on a first soda-lime glass substrate 30 by DC sputtering. The transparent conductive film is then patterned into segment electrodes by known photolithography. Common electrodes made of ITO are formed on a second soda-lime glass substrate 31 in the same manner. Orientation control films are formed on the first substrate 30 and the second substrate 31 by applying polyamic acid thereon by the use of an offset press and subsequently heating the polyamic acid at 300° C. for 3 hours to obtain polyimide films on the substrates 30 and 31 and subsequently rubbing the polyimide films by the use of cotton cloth. Fine balls (spacers) made of $SiO_2$ and having a diameter of 7.5 μm are dispersed on one of the substrates and an epoxy sealing material 37 is applied on the other one of the substrates by screen printing. The substrates are then mated so that the rubbing direction of the orientation control film formed on the first substrate and the rubbing direction of the orientation control film formed on the second substrate form an angle of 240°. Then, a liquid crystal comprising nematic liquid crystal having positive dielectric anisotropy and optically active substances is introduced into the inside 38 through an introduction port by known vacuum introduction method. A liquid crystal panel 35 thus obtained is inflated at its center due to excess liquid crystal introduced. The liquid crystal panel 35 is then pressed to discharge excess liquid crystal therefrom until surfaces of the panel 35 become flat. Then, the introduction port is sealed by an ultraviolet light hardening resin whereby a liquid crystal panel 35 having a twist angle of 240° is completed.

First and second phase difference films 34 and 33 are stuck on a surface of a polarizing plate 32 and the films 33 and 34 and the plate 32 are stuck on a surface of the liquid crystal panel 35 as shown in FIGS. 1 and 3. Further, another polarizing plate 36 is stuck on another surface of the liquid crystal panel 35. The phase difference films 33 and 34 are polymer films, for example polyvinyl alcohol films or polycarbonate films, in the first preferred embodiment. Reference numeral 11 in FIG. 1 designates the drawing direction of the first phase difference film 34. Reference numeral 12 in FIG. 1 designates the drawing direction of the second phase difference film 33. The first phase difference film has a retardation $\Delta nd$ of 305 nm where d is thickness thereof and $\Delta n$ is anisotropy of refractive index, that is $\Delta n = n_1 - n_2$. In the first preferred embodiment, $n_1$ is refractive index in a direction parallel to the drawing direction of the film and $n_2$ is refractive index in a direction perpendicular to the drawing direction. Retardation $\Delta nd$ of the second phase difference film is 390 nm. In FIG. 1, reference (b) designates an angle formed by the drawing direction of the first film and an edge line 15 of the liquid crystal panel and reference (a) designates an angle formed by the drawing direction of the second film and the edge line 15. (b) is 55° and (a) is 15° in the first preferred embodiment. That is, $|(a)-(b)|$ is 40° in the first preferred embodiment. An angle formed by the drawing direction of the first film and the rubbing direction of the orientation control film formed on the substrate 30 adjacent to the first film is 40° to 160°, for example 70°. An angle formed by the edge line 15 and absorption axis of one of the polarizing plates is 0° to 90°, for example 10°. In accordance with measurement of the contrast, a very high contrast not lower than 80 is obtained.

Although two phase difference films are used in the above embodiment, only one phase difference film may be used instead thereof.

As described in the above embodiment, the angles (a) and (b) are defined as angles formed by the edge line 15 of the liquid crystal panel and the drawing directions of the first and second films, however, in the case where drawing directions of phase difference films are not parallel to $n_1$ and $n_2$ directions thereof, $n_1$ and $n_2$ directions are used to define angles (a) and (b) in combination with an edge line of a liquid crystal panel rather than the drawing directions.

Figure 2:
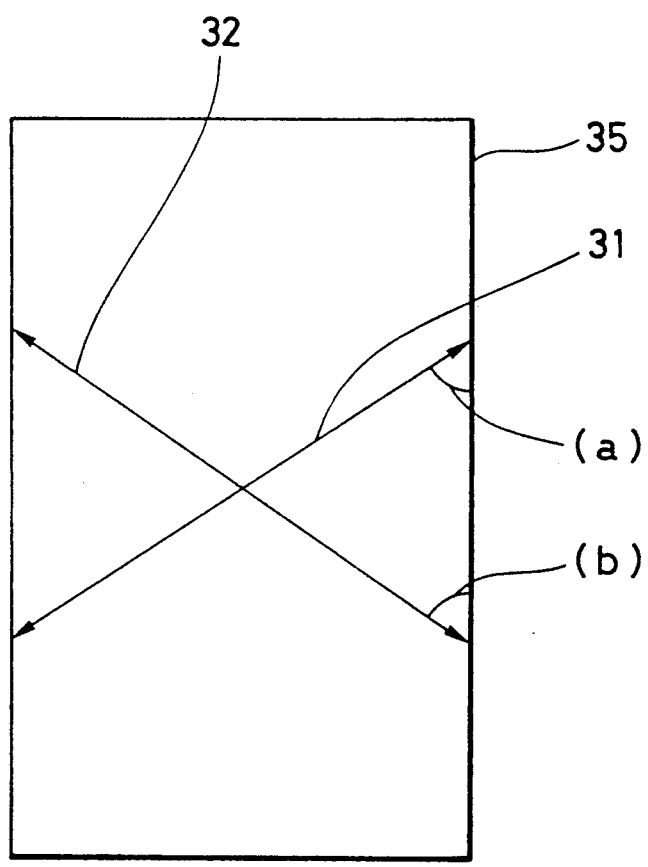
FIG. 2 is an explanatory view showing angles formed by an edge line of a liquid crystal panel and drawing directions of retardation films for optic compensation in accordance with a second preferred embodiment.
Figure 4:
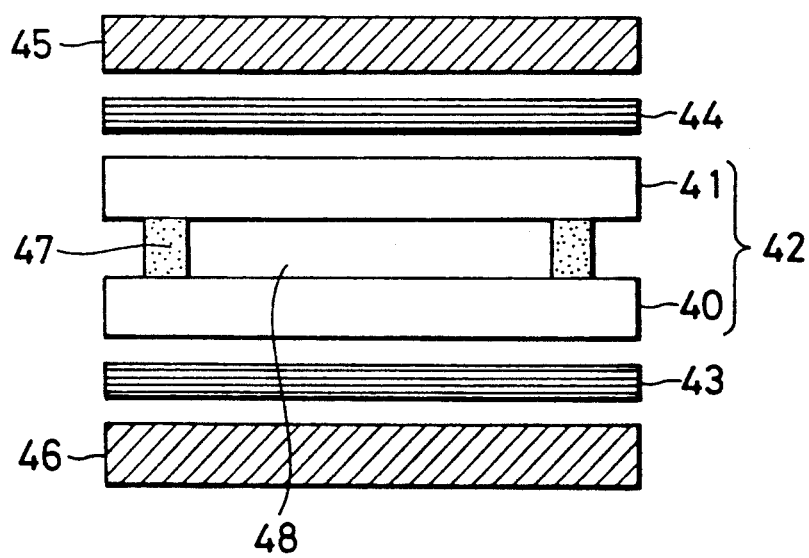
FIG. 4 is a schematic cross sectional view showing a liquid crystal electro-optic device in accordance with a second preferred embodiment of the present invention.
Figure 5:
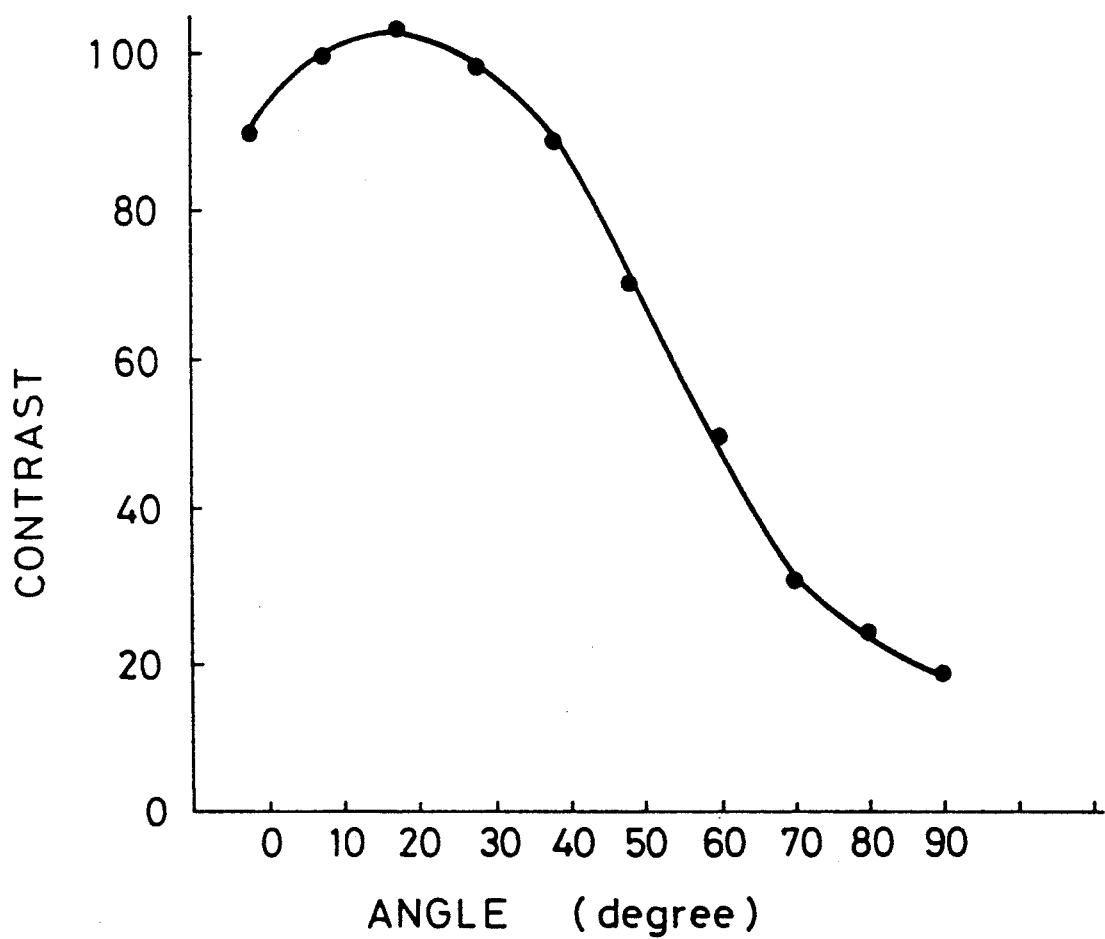
FIG. 5 is a graph showing relationship between contrast and an angle in accordance with the present invention.
Figure 6:
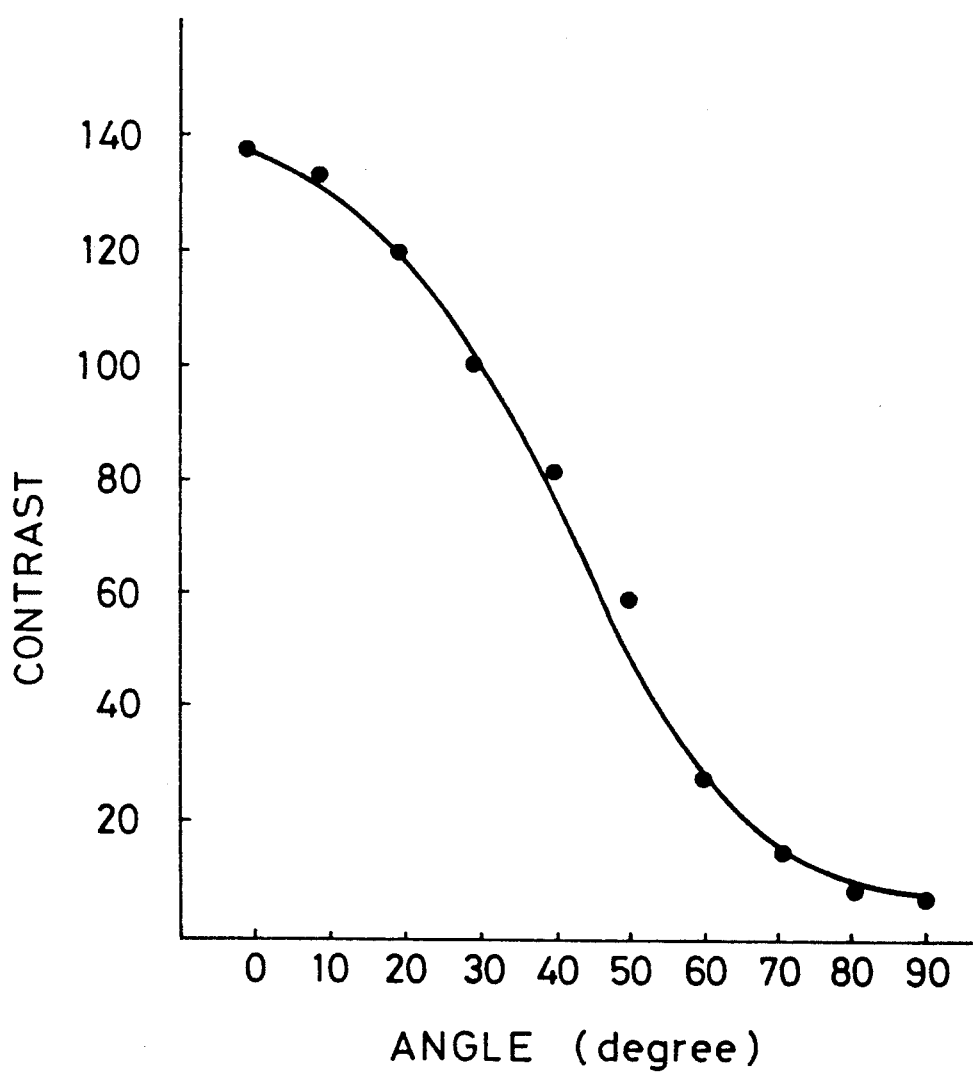
FIG. 6 is a graph showing relationship between contrast and an angle in accordance with the present invention.

Referring to FIGS. 2 and 4, a liquid crystal electro-optic device in accordance with a second preferred embodiment of the present invention will be described.

A transparent conductive film made of ITO (indium tin oxide) is formed on a first soda-lime glass substrate 41 by DC sputtering. The transparent conductive film is then patterned into segment electrodes by known photolithography. Common electrodes made of ITO are formed on a second soda-lime glass substrate 40 in the same manner. Polyamic acid is then applied on the first substrate 41 and the second substrate 40 by the use of an offset press and polyimide films are obtained on the substrates 41 and 40 by heating the polyamic acid at 300° C. for 3 hours. The polyimide films are then subjected to rubbing treatment by the use of cotton cloth. Fine balls (spacers) made of $SiO_2$ and having a diameter of 7.5 μm are dispersed on one of the substrates and an epoxy sealing material 47 is applied on the other one of the substrates by screen printing. The substrates are then mated so that the rubbing direction of the polyimide film formed on the first substrate and the rubbing direction of the polyimide film formed on the second substrate form an angle of 240°. Then, a liquid crystal comprising nematic liquid crystal having positive dielectric anisotropy and optically active substances is introduced into the inside 48 through an introduction port by known vacuum introduction method. A liquid crystal panel 42 thus obtained is inflated at its center due to excess liquid crystal introduced. The liquid crystal panel 42 is then pressed to discharge excess liquid crystal therefrom until surfaces of the panel 42 become flat. Then, the introduction port is sealed by an ultraviolet light hardening resin whereby a liquid crystal panel 42 having a twist angle of 240° is completed.

A pair of first and second phase difference films 43 and 44 are stuck on surfaces of the liquid crystal panel and a pair of polarizing plates 45 and 46 are stuck on the phase difference films 43 and 44 as shown in FIGS. 2 and 4. The phase difference films 43 and 44 are polymer films, for example polyvinyl alcohol films or polycarbonate films, in the second preferred embodiment. Reference numeral 31 in FIG. 2 designates the drawing direction of the first phase difference film 43. Reference numeral 32 in FIG. 2 designates the drawing direction of the second phase difference film 44. The first phase difference film has a retardation $\Delta nd$ of 350 nm. Retardation $\Delta nd$ of the second phase difference film is 350 nm. Retardation of the liquid crystal panel is about 810 nm. In FIG. 2, reference (a) designates an angle formed by the drawing direction of the first film 43 and an edge line 35 of the liquid crystal panel and reference (b) designates an angle formed by the drawing direction of the second film 44 and the edge line 35. The angle (b) is 72° and the angle (a) is 72° in the second preferred embodiment. That is, $|(a)-(b)|$ is 0° in the second preferred embodiment. An angle formed by the drawing direction of the first film and the rubbing direction of the orientation control film formed on the substrate 40 adjacent to the first film is 40° to 160°, for example 85°. An angle formed by the edge line 35 and absorption axis of one of the polarizing plates are 0° to 90°, for example 10°. In accordance with measurement of the contrast, a very high contrast not lower than 80 is obtained.

Although two phase difference films are used in the above embodiment, only one phase difference film may be used instead thereof.

The contrast mentioned in the foregoing is contrast of one picture element. Aperture ratio of the liquid crystal electro-optic device in accordance with the second preferred embodiment is 82%. Contrast of the liquid crystal electro-optic device is not less than 10 since the aperture ratio is 82%. This contrast is as high as that of a liquid crystal electro-optic device comprising two panels, namely a liquid crystal panel for driving liquid crystal and a liquid crystal panel for optic compensation. Moreover, the liquid crystal electro-optic device in accordance with the present invention is thinner and lighter in weight than the liquid crystal electro-optic device comprising such two panels.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated. An example of such modifications is as follows:

Although polymer films are used in the foregoing embodiments, other films made of transparent material and having anisotropy of refractive index may be used instead thereof.

What is claimed is:

1. A liquid crystal electro-optic device comprising:
   a pair of substrates provided with electrodes thereon;
   a liquid crystal layer provided between said substrates, said liquid crystal layer comprising nematic liquid crystal having positive dielectric anisotropy and optically active substances in a helical structure of a twist angle in the range of 180° to 270°;
   a first retardation film having anisotropy of refractive index; and
   a second retardation film having anisotropy of refractive index,
   wherein an angle (a) formed by the drawing direction of said first film and an edge line of one of said substrates and an angle (b) formed by the drawing direction of said second film and said edge line satisfy the expressions: (a)$\leq$90° ; (b)$\leq$90° ; and $|(a)-(b)| \leq 40°$ ;
   wherein retardations of said first and second retardation films are equal and are each less than or equal to 390 nm.

2. The liquid crystal electro-optic device of claim 1 wherein each of said first film and said second film is a film selected from the group consisting of polymer film and macromolecule film.

3. The liquid crystal electro-optic device of claim 1 wherein said material comprises a material selected from the group consisting of polyvinyl alcohol and polycarbonate.

4. The liquid crystal electro-optic device of claim 1 further comprising an orientation control film provided on one of said substrates adjacent to said first film, said orientation control film being rubbed in a direction making an angle in the range of 40° to 160° with the drawing direction of said first film.

5. A liquid crystal electro-optic device comprising:
   a first retardation film having anisotropy of refractive index;
   a second retardation film having anisotropy of refractive index; and
   a pair of substrates provided with electrodes thereon and provided between said first film and said second film;
   a liquid crystal layer provided between said substrates, said liquid crystal layer comprising nematic liquid crystal having positive dielectric anisotropy and optically active substances in a helical structure of a twist angle in the range of 180° to 270°,
   wherein an angle (a) formed by the drawing direction of said first film and an edge line of one of said substrates and an angle (b) formed by the drawing direction of said second film and said edge line satisfy the expressions: (a)$\leq$90°; (b)$\leq$90°; and $|(a)-(b)| \leq 40°$;
   wherein retardations of said first and second retardation films are equal and are each less than or equal to 390 nm.

6. The liquid crystal electro-optic device of claim 5 wherein each of said first film and said second film is a film selected from the group consisting of polymer film and macromolecule film.

7. The liquid crystal electro-optic device of claim 5 wherein said material comprises a material selected from the group consisting of polyvinyl alcohol and polycarbonate.

8. The liquid crystal electro-optic device of claim 5 further comprising orientation control films provided on said substrates respectively and rubbed.

9. The liquid crystal electro-optic device of claim 8 wherein an angle formed by the drawing direction of said first film and the rubbing direction of the orientation control film provided on the substrate adjacent to said first film is 40° to 160° and an angle formed by the drawing direction of said second film and the rubbing direction of the orientation control film provided on the substrate adjacent to said second film is 40° to 160°.

10. The liquid crystal electro-optic device of claim 5 wherein retardation of said first film is substantially equal to that of said second film.

11. A liquid crystal electro-optic device comprising:
    a pair of substrates provided with electrodes thereon;
    a liquid crystal layer provided between said substrates, said liquid crystal layer comprising nematic liquid crystal having positive dielectric anisotropy and optically active substances in a helical structure of a twist angle in the range of 180° to 270°;
    a first retardation film having anisotropy of refractive index provided on one of said substrates; and
    a second retardation film having anisotropy of refractive index provided on said first film,
    wherein an angle (a) formed by the drawing direction of said first film and an edge line of one of said substrates and an angle (b) formed by the drawing direction of said second film and said edge line satisfy the expressions: (a)$\leq$90°; (b)$\leq$90°; and $|(a)-(b)| \leq 40°$;
    wherein retardations of said first and second retardation films are equal and are each less than or equal to 390 nm.

12. The liquid crystal electro-optic device of claim 11 wherein each of said first film and said second film is a film selected from the group consisting of polymer film and macromolecule film.

13. The liquid crystal electro-optic device of claim 11 wherein said material comprises a material selected from the group consisting of polyvinyl alcohol and polycarbonate.

14. The liquid crystal electro-optic device of claim 11 further comprising an orientation control film provided on the substrate adjacent to said first film and rubbed.

15. The liquid crystal electro-optic device of claim 14 wherein an angle formed by the drawing direction of said second film and the rubbing direction of said orientation control film is 40° to 160°.

* * * * *